United States Patent
Vickers et al.

(10) Patent No.: US 11,087,388 B1
(45) Date of Patent: Aug. 10, 2021

(54) PRODUCT-FOCUSED SEARCH METHOD AND APPARATUS

(71) Applicant: The Sherwin-Williams Company, Cleveland, OH (US)

(72) Inventors: Meghan L Vickers, Willoughby, OH (US); Pamela A Gillikin, Newbury, OH (US)

(73) Assignee: SWIMC LLC, Cleveland, OH (US)

( * ) Notice: Subject to any disclaimer, the term of this patent is extended or adjusted under 35 U.S.C. 154(b) by 618 days.

(21) Appl. No.: 15/798,496

(22) Filed: Oct. 31, 2017

Related U.S. Application Data

(60) Provisional application No. 62/414,993, filed on Oct. 31, 2016.

(51) Int. Cl.
  *G06Q 30/00* (2012.01)
  *G06Q 30/06* (2012.01)
  *G06F 16/951* (2019.01)

(52) U.S. Cl.
  CPC ....... *G06Q 30/0643* (2013.01); *G06F 16/951* (2019.01); *G06Q 30/0621* (2013.01); *G06Q 30/0627* (2013.01)

(58) Field of Classification Search
  CPC .......... G06Q 30/0621; G06Q 30/0627; G06Q 30/0643; G06F 16/951
  See application file for complete search history.

(56) References Cited

U.S. PATENT DOCUMENTS

| | | | |
|---|---|---|---|
| 5,249,263 A | * | 9/1993 | Yanker ................ G06F 3/04845 345/594 |
| 5,844,542 A | | 12/1998 | Inoue et al. |
| 6,502,049 B1 | | 12/2002 | Takada et al. |

(Continued)

FOREIGN PATENT DOCUMENTS

| CN | 2340001 | 9/1999 |
|---|---|---|
| EP | 1359399 | 5/2003 |

(Continued)

OTHER PUBLICATIONS

Zak Ruvalcaba et al. "Murach's HTML and CSS3" Mike Murach & Associatesm Inc. ISBN: 978-1-890774-66-0 (Year: 2012).*

(Continued)

*Primary Examiner* — Naeem U Haq
(74) *Attorney, Agent, or Firm* — Patterson Thuente Pedersen, P.A.

(57) ABSTRACT

Provided are a method and computer system for facilitating selection of a paint by a user over a communication network. A server component of the computer system receives a type of the paint available on a website desired by the user over the communication network, and transmits content over the communication network to present the user with an arrangement of available colors for the paint. A desired color selected by the user from the arrangement of available colors is received. Without transmitting content over the communication network to cause the user computer to separately present all variants of the paint comprising both the type of the paint and the desired color selected by the user, content indicative of a collection of variants of the paint and a selectable menu of options for specifying an additional parameter that identifies a desired variant of the paint are transmitted.

16 Claims, 9 Drawing Sheets

(56) References Cited

U.S. PATENT DOCUMENTS

| | | |
|---|---|---|
| 6,556,303 B1 | 4/2003 | Rangarajan et al. |
| 6,563,510 B1 * | 5/2003 | Rice .......................... G01J 3/46 |
| | | 345/530 |
| 6,641,696 B1 | 11/2003 | Edgerton |
| 6,744,513 B2 | 6/2004 | Kubo et al. |
| 7,042,566 B2 | 5/2006 | Skierski et al. |
| 7,116,420 B2 | 10/2006 | Skierski et al. |
| 7,180,524 B1 | 2/2007 | Axelrod |
| 7,230,707 B2 | 6/2007 | Ingleson et al. |
| 7,430,316 B2 | 9/2008 | Boston et al. |
| 7,796,296 B2 | 9/2010 | Martinez et al. |
| 7,935,274 B2 | 5/2011 | Sara et al. |
| 7,999,825 B2 | 8/2011 | Webb et al. |
| 8,244,032 B2 | 8/2012 | Sara et al. |
| 8,319,788 B2 | 11/2012 | Buzyn et al. |
| 8,517,267 B2 | 8/2013 | Reynolds et al. |
| 8,752,762 B2 | 6/2014 | Woelfel et al. |
| 9,152,311 B2 | 10/2015 | Buzyn et al. |
| 9,530,163 B2 * | 12/2016 | Buzyn .................. G06F 3/0481 |
| 9,563,342 B2 | 2/2017 | Reynolds et al. |
| 9,619,052 B2 | 4/2017 | Bergstein et al. |
| 9,639,983 B2 | 5/2017 | Buzyn et al. |
| 9,857,888 B2 | 1/2018 | Reynolds et al. |
| 9,971,487 B2 | 5/2018 | Buzyn et al. |
| 10,809,884 B2 * | 10/2020 | Vickers ............... G06F 3/04817 |
| 2002/0152132 A1 * | 10/2002 | Hirayama ........ G06Q 10/06311 |
| | | 705/7.13 |
| 2003/0151611 A1 | 8/2003 | Turpin et al. |
| 2004/0093112 A1 | 5/2004 | Marchand et al. |
| 2004/0131756 A1 | 7/2004 | Skierski et al. |
| 2004/0223149 A1 | 11/2004 | Skierski et al. |
| 2005/0100210 A1 * | 5/2005 | Rice ........................ G06Q 30/02 |
| | | 382/162 |
| 2005/0102349 A1 * | 5/2005 | Rice ........................ G06Q 30/02 |
| | | 709/201 |
| 2005/0219561 A1 | 10/2005 | Haikin |
| 2006/0195369 A1 * | 8/2006 | Webb ................. G06Q 30/0603 |
| | | 705/26.81 |
| 2006/0210153 A1 | 9/2006 | Sara et al. |
| 2008/0218814 A1 | 9/2008 | Ferlitsch |
| 2009/0231356 A1 | 9/2009 | Barnes et al. |
| 2011/0018896 A1 * | 1/2011 | Buzyn .................. G06F 3/0481 |
| | | 345/594 |
| 2011/0210978 A1 | 9/2011 | Sara et al. |
| 2012/0019572 A1 | 1/2012 | Lim |
| 2012/0138168 A1 | 6/2012 | Richter |
| 2012/0217360 A1 | 8/2012 | Fanning, Jr. et al. |
| 2013/0268871 A1 * | 10/2013 | Webb ..................... G06F 3/0482 |
| | | 715/760 |
| 2014/0025534 A1 * | 1/2014 | Pesicek .............. G06Q 30/0641 |
| | | 705/26.8 |
| 2014/0075361 A1 * | 3/2014 | Reynolds ........... G06Q 30/0603 |
| | | 715/771 |
| 2015/0178815 A1 * | 6/2015 | Cassidy ............. G06Q 30/0635 |
| | | 705/26.5 |
| 2015/0178955 A1 | 6/2015 | Topakas et al. |
| 2015/0235389 A1 | 8/2015 | Miller et al. |
| 2015/0268098 A1 | 9/2015 | Minchew et al. |
| 2016/0119399 A1 * | 4/2016 | Glass .................... H04L 67/141 |
| | | 709/219 |
| 2016/0275702 A1 | 9/2016 | Reynolds et al. |
| 2017/0161822 A1 * | 6/2017 | Crogan ................. G06F 3/0482 |
| 2018/0025411 A1 * | 1/2018 | Crogan ............. G06Q 30/0641 |
| | | 705/26.81 |
| 2018/0074605 A1 | 3/2018 | Reynolds et al. |
| 2019/0066338 A1 | 2/2019 | Perlman et al. |
| 2019/0138168 A1 | 5/2019 | Vickers et al. |
| 2019/0301941 A1 | 10/2019 | Kawabata et al. |

FOREIGN PATENT DOCUMENTS

| | | |
|---|---|---|
| FR | 2698982 | 6/1994 |
| JP | 11269411 | 10/1999 |

OTHER PUBLICATIONS

Lebow et al., "Classification of Wood Surface Features by Spectral Reflectance", Jan. 1996. Wood and Fiber Science, vol. 28(1), 1996., pp. 74-90.

"Blue Stain", U.S. Department of Agriculture, Forest Service, Forest Products Laboratory, 2 pages, (May 2002).

International Search Report for PCT/US2006/009845 dated Jul. 27, 2006.

* cited by examiner

FIG. 4

PRODUCT-FOCUSED SEARCH METHOD AND APPARATUS

This application claims the benefit of U.S. provisional application No. 62/414,993 filed on Oct. 31, 2016, the entirety of which is hereby incorporated by reference.

BACKGROUND OF THE INVENTION

1. Field of the Invention

This application relates generally to a method and apparatus for searching for a product over a communication network and, more specifically, for presenting a large number of search results in an efficient manner using a categorized approach.

2. Description of Related Art

Vendors commonly offer a variety of products for sale on their websites. Such websites, along with websites that do not afford users the ability to purchase and pay for items via the website, often allow users the ability to search for items available at brick-and-mortar stores. To locate products of interest users type a search string into a search field appearing on the website and a search algorithm is used to query a product database and identify products that correspond to the search string. The results are then transmitted by a server over a communication network to be displayed by a user computer for review by the user.

Searches based on a search string including a somewhat unique key word return a reasonable number of search results that are transmitted over the communication network to be presented to the user for review. However, certain products may not be adequately distinguished from a large number of other products through the use of key words as part of a search string. For example, conducting a search for a certain color of paint, or a particular application (e.g., interior paint, or exterior paint, etc.) on the website for a paint store or home improvement store will return each paint entry having a stock keeping unit ("SKU") record containing information that matches the search string. Even though many of the paint entries returned by the search are related, differing only in the volume, finish, etc., each such entry will have its own unique SKU record and will be returned as a separate search result displayed to the user. The end result is that far too many search results are returned to the user to be useful. Computer displays lack the display area required to efficiently display all of the search results in a display screen, and a significant amount of network bandwidth is consumed to transmit so many search results to the user computer at once.

BRIEF SUMMARY OF THE INVENTION

Accordingly, there is a need in the art for a method and apparatus to efficiently transmit information corresponding to a large number of related search results on a website without consuming significant bandwidth, and for generating a user interface with the large number of search results condensed based on one or more attributes of the products instead of based solely on a reference number assigned to such products.

According to one aspect, the subject application involves a method of returning search results for paint products as a result of a website search. The subject method includes using a server component of a computer system to receive a search string over a communication network. The search string was entered into a user computer that is remotely located from the server component and transmitted by the user computer over a communication network. With a query component of the computer system, a query of a database accessible by the computer system is initiated for the search results corresponding to the paint products satisfying the search string. Search content comprising collections of related products returned in the search results that share a common property is also generated, where the related products are uniquely identified by different identification numbers on the website. The search content is then transmitted over the communication network to cause the collections to be displayed by the user computer for presenting a user with a categorized presentation of the search results.

According to another aspect, the subject application involves a computer system for efficiently returning search results to be presented to a user. The computer system includes a server component configured to receive a search string over a communication network. The search string was previously entered into a user computer that is remotely located from the server component, and transmitted by the user computer over the communication network. A non-transitory computer storage device stores a searchable database of paint products that appear on a website, with each paint product being associated with a unique, internal identification number. A query component initiates a query of the database for the search results corresponding to the paint products satisfying the search string, and generates search content comprising a plurality of collections that each include related products returned as part of the search results that share a common property. The related products are each uniquely identified by different identification numbers within the database, and the search content is transmitted by the server component over the communication network to cause the user computer to display the collections in a categorized presentation of the search results.

According to another aspect, the subject application involves a method for facilitating selection of a paint by a user over a communication network. A server component of the computer system receives a type of the paint available on a website desired by the user over the communication network, and transmits content over the communication network to present the user with an arrangement of available colors for the paint. A desired color selected by the user from the arrangement of available colors is received. Without transmitting content over the communication network to cause the user computer to separately present all variants of the paint comprising both the type of the paint and the desired color selected by the user, content indicative of a collection of variants of the paint and a selectable menu of options for specifying an additional parameter that identifies a desired variant of the paint are transmitted.

According to another aspect, the subject application involves a computer system for efficiently facilitating selection of a paint by a user over a communication network. The computer system includes a non-transitory computer storage device storing a database of paint that is selectable on a website. A server component is configured to receive a type of the paint available on the website selected as being desired by the user over the communication network, and transmit content over the communication network to be utilized by a user computer to present the user with an arrangement of available colors for the paint. The server component is further configured to receive a desired color selected by the user from the arrangement of available colors. Without transmitting content over the communication network to cause the user computer to separately present all variants of the paint comprising both the type of the paint and the desired color selected by the user, content indicative of a collection of variants of the paint and a selectable menu of options for specifying an additional parameter that identifies a desired variant of the paint are transmitted by the server component.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein:

FIG. 4 is an illustrative representation of a search result interface displaying a plurality of collections of uniquely-identifiable search results grouped together in collections based on a share property of the search results in each collection;

DETAILED DESCRIPTION OF THE INVENTION

Figure 1:
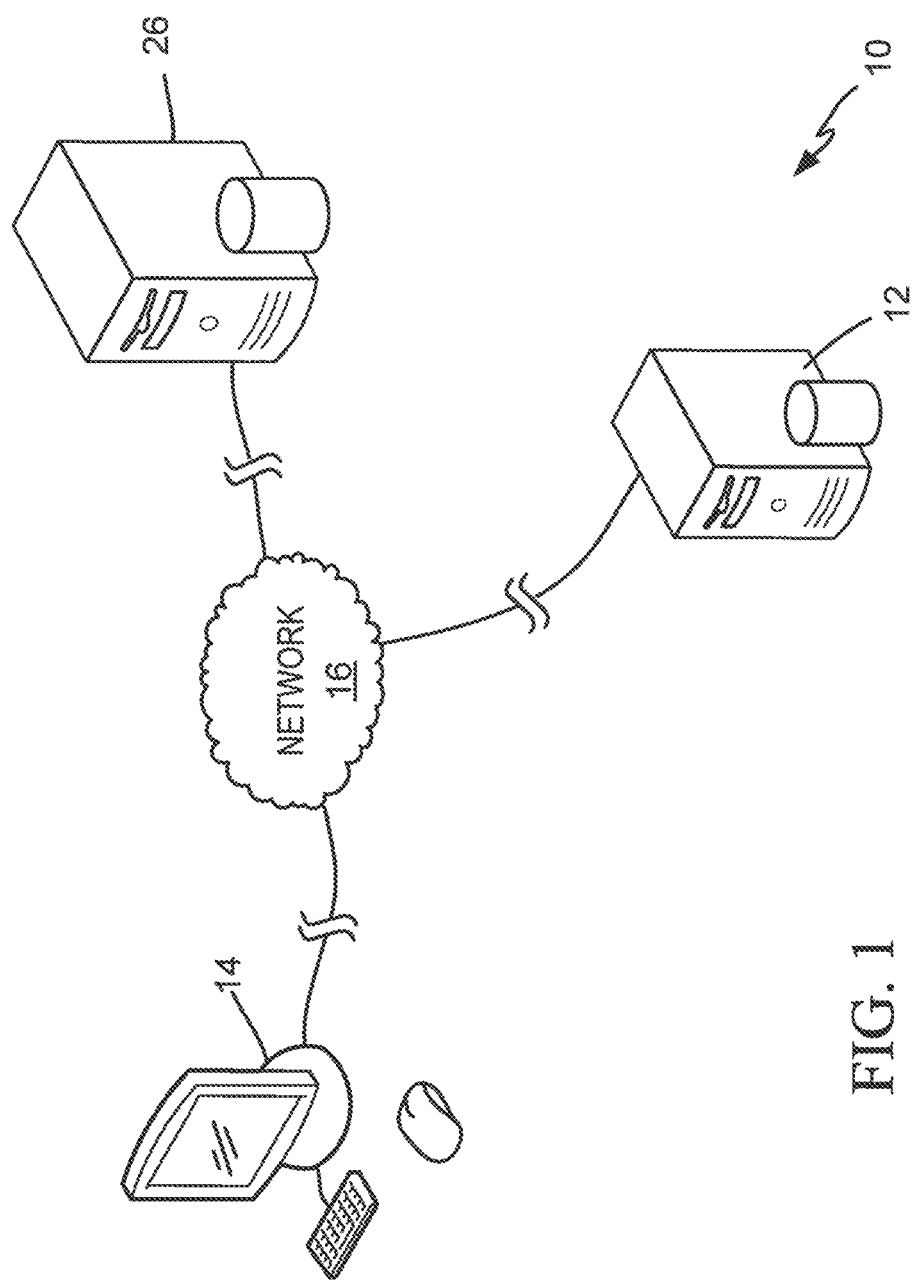
FIG. 1 is a schematic representation of a computer system for efficiently returning search results to be presented to a user over a communication network.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

An illustrative embodiment of a computer system 10 including a server 12 that returns search results to a user computer 14 over a communication network 16 in an efficient and usable manner is shown in FIG. 1. As described in detail below, the user computer 14 can access a website over the communication network 16 to retrieve a user interface including a search field in which a search string of interest to a user can be entered. The website can be a hosted for the benefit of one or more private vendors, and include a variety of articles for sale online and/or in a brick-and-mortar store. In response to the submission of a search string by the user computer 14 over the communication network 16, a database is queried and the =covered products satisfying the search string are allocated to one or more collections. The uncovered products included in a collection each share a common property specific to that collection, and the common property is different than the common property shared by products allocated to a different collection. Search content indicative of at least the collections is transmitted by the server 12 over the communication network 16 to be utilized by the user computer 14 to generate a display presenting the collections of the products returned by the query to the user. The search content transmitted over the communication network 16 to the user computer 14 can be selectable by the user, allowing the user to select a collection of interest to gain additional insight into the related products allocated to that collection of interest. Thus, the search results are transmitted in a useable manner that avoids initially presenting the user with an overwhelming number of search results simultaneously, that may interfere with the user's ability to navigate the website and locate the article(s) of interest.

Figure 2:
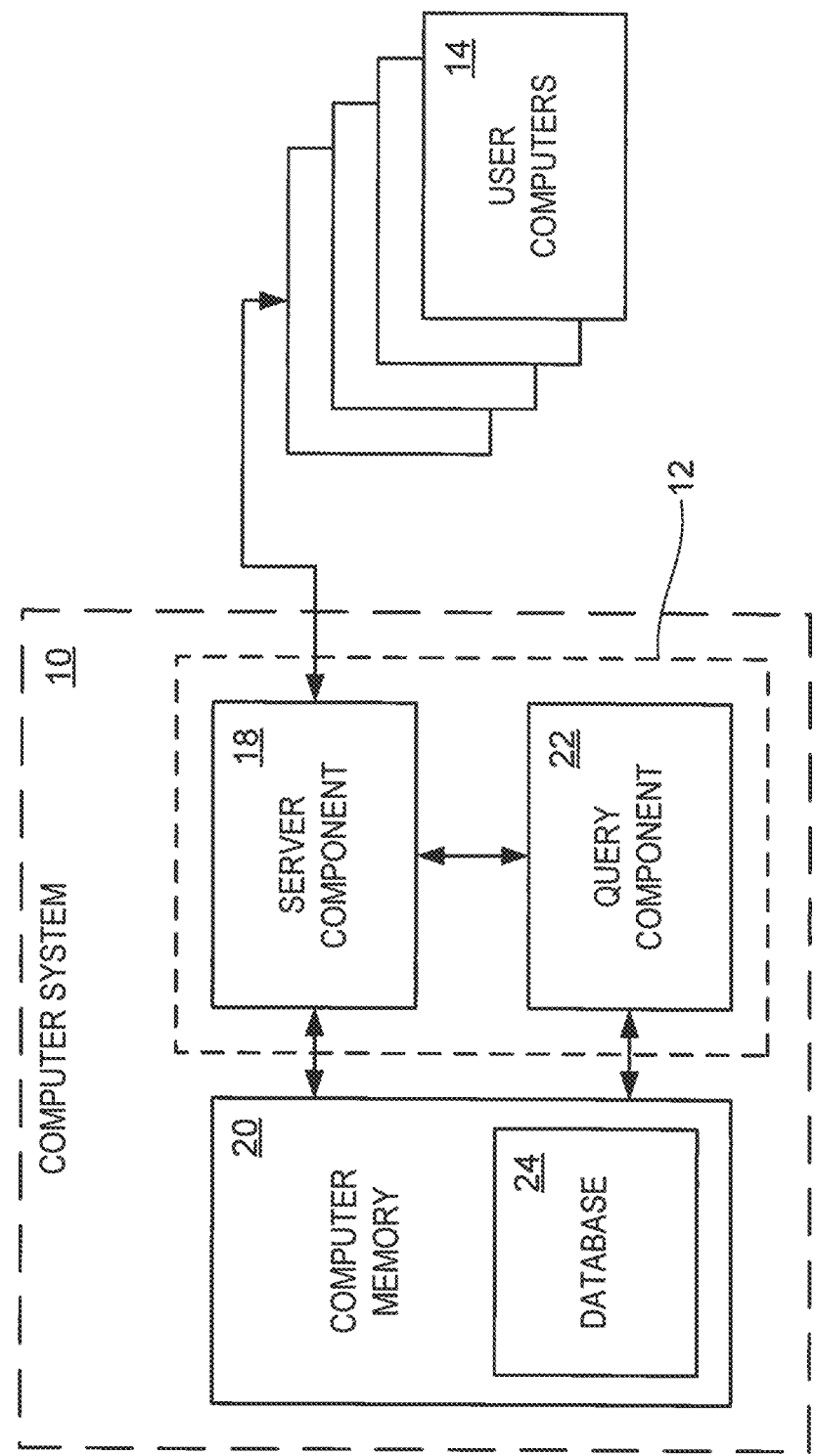
FIG. 2 is a block diagram schematically illustrating components of a computer system for efficiently returning search results to be presented to a user.

Shown in greater detail in FIG. 2, the computers system 10 includes a server component 18 that can be implemented as a computer processor provided to the server 12 programmed to execute the Apache HTTP Server software in a Linux or Microsoft Windows environment, for example. The server component can serve content to, and receive communications from a plurality of user computers 14 concurrently. Examples of the content that can be served by the server component 18 include, but are not limited to HTML and XML documents according to HTTP. For purposes of the discussion below, the server component 18 serves content on a website accessible from a non-transitory computer memory 20 to the user computer 14, thereby enabling the user computer 14 to use that served content to generate the interfaces described herein.

The computer system 10 also includes a query component 22 that initiates a query of a database 24 for search results that include products satisfying a search string transmitted by the user computer 14. Like the server component, the query component 22 can be implemented as a computer processor, optionally the same computer processor utilized for implementation of the server component 18 or a separate computer processor provided to a different terminal, programmed with computer-executable instructions stored in the accessible computer memory 20. The computer memory 20 storing such executable instructions is shown in FIG. 2 as being the same computer memory 20 storing the database 24, but the present disclosure is not so limited. Embodiments of the computer system 10 utilizing a common computer processor to implement both the server component 18 and the query component 22 can optionally also include the computer memory 20 in the same terminal, such as the server 12 in FIG. 1. However, alternate embodiments of the present computer system 10 can be distributed, meaning that at least one of the computer memory 20 storing the database 24, the server component 18 and the query component 22 can be provided to a physically separate terminal, that can be locally and/or remotely accessed by the other components. For example, to allow a centralized database 24 to be updated, a separate database server 26 such as that shown in FIG. 1 can optionally be included in addition to the server 12 as part of the computer system 10 without departing from the scope of the present disclosure.

Although the present system and method may be useful for conducting a network search for any product, for the sake of brevity and clarity the discussion that follows will use a search for paint products as an illustrative example. In addition to paints and other coatings, the phrase "paint products" also encompasses any products that can be purchased for use in applying, removing, storing and transporting paint. Paint products are a particularly illustrative example for efficiently returning search results to users in collections as part of a categorized presentation based on product similarities instead of internal identification numbers because many paint products are related. For example, a plurality of the related products allocated to a given collection as described below may share a common physical construction, chemical composition, attribute or even constitute the same product. But those related products may differ in a manner unrelated to the makeup of those products. For example, a semi-gloss, latex interior paint in a specific color may be sold in at least three different volumes, such as in one quart, one gallon and five gallon containers, Although the paint in each of the different container sizes is exactly the same, each is assigned a different internal identification number in the database 24. The stock keeping unit ("SKU") will be used as an example of an internal identification number assigned to uniquely identify each individual product variant in the database 24. Unlike a Universal Product Code ("UPC"), which is a standardized number that can be universally read and interpreted to identify a product, but not necessarily the specific variant of a product, the SKU is not a standardized number that is useful outside of the entity in which it is defined. In other words, the SKU is a proprietary, internal reference number associated with each of the plurality of variants of a product in the database 24 to uniquely identify each of those product variants, as well as uniquely identify similar products and their respective variants. Uniquely identifying related products allows for an accurate determination of the remaining stock of such products in inventory.

The server component 18 and the user computer 14 are remotely located from each other, accessible over the communication network 16. The computer network 16 can include aspects of a local area network ("LAN") such as a router, switch, or other such devices useful to facilitate network communications at a specific location, a wide area network ("WAN") such as public communication lines utilized by the Internet, or a combination thereof.

Figure 3:
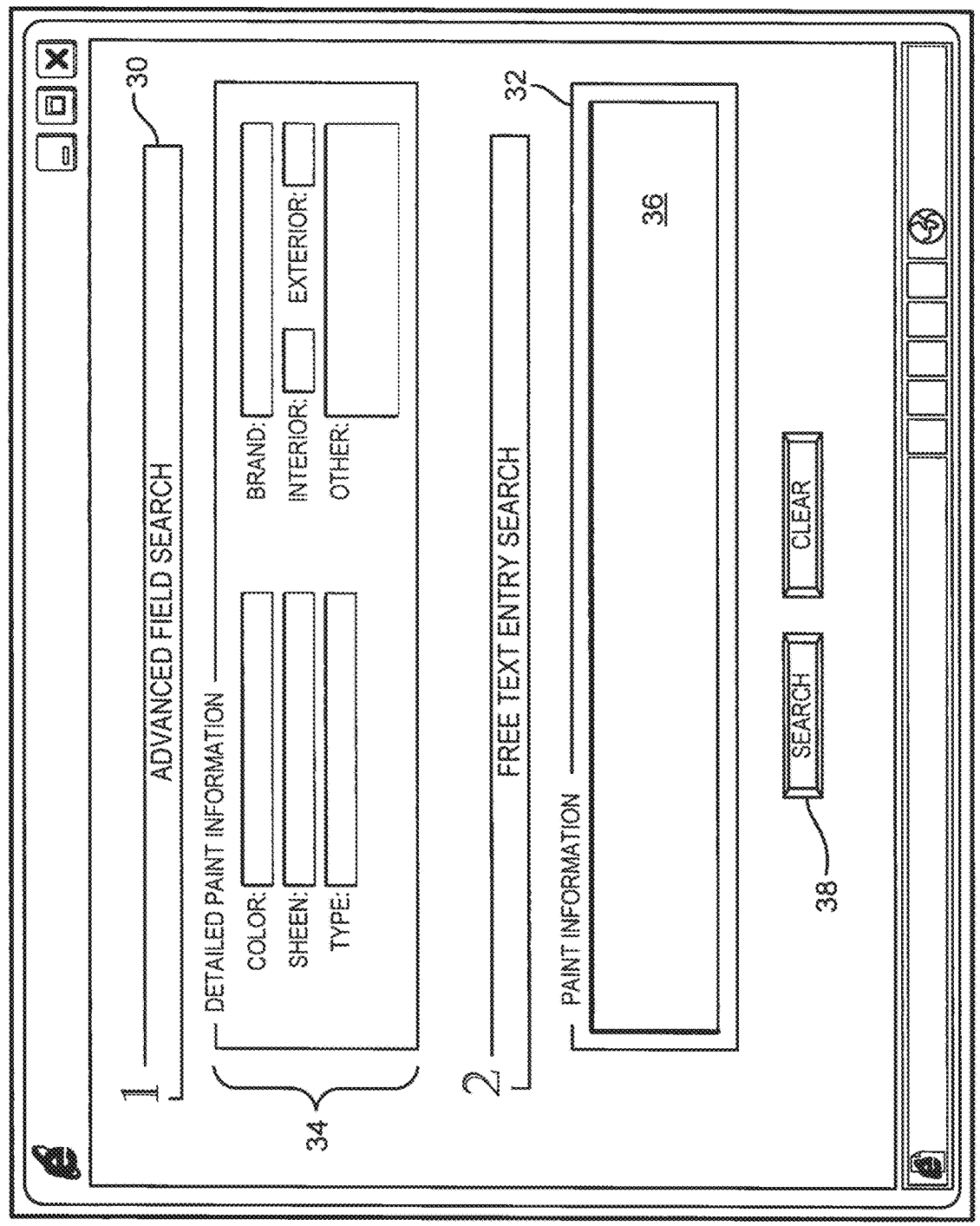
FIG. 3 is an illustrative representation of a search interface generated by a user computer utilizing content served by a server.

In use, the server component 18 is operable to serve content over the communication network that, when received and interpreted by the user computer 14, causes the user computer 14 to generate a search interface 28 such as that shown in FIG. 3. Although the content served by the server component 18 can define at least one tillable search field in which a search string can be entered, the embodiment of the interface 28 shown in FIG. 3 includes an advanced field search option 30 and a general free-text option 32. The field search option 30 includes a plurality of finable fields 34 into which specific types of data corresponding to paint products are to be entered to collectively form the search string. In contrast, the free-text option 32 includes a field 36 in which the user can type the desired search string, optionally using Boolean operators or other suitable syntax. According to alternate embodiments, the desired search string can be entered without typing text. For example, the content served by the server component 18 can optionally include a graphical layout of different paint colors available that are selectable by "clicking" thereon using a computer pointing device or touch screen display, a pull-down menu from which a general product category can be selected, a menu with check boxes or other selection mechanism, etc. Selections entered in this manner can be converted into text by the user computer 14 to be transmitted in an XML format, for example, over the communication network 16 to the server component 18. For the sake of brevity and clarity, however, the examples described and illustrated herein include the desired search string entered as text.

The user computer 14 transmits the entered search string over the communication network 16 to be received by the server component in response to selection of a search button 38. Upon receiving the search string, the server component 18 conveys information indicative of the received search string to the query component 22. The query component 22 initiates a query of the database 24 based on the search string in an effort to identify paint products likely to be of interest to the user requesting the search. The query component 22 also generates search content indicative of the results of the query. This search content includes a plurality of collections into which the uncovered search results are to be categorized. The number and subject matter of the categories can be determined based on the result of the query. For example, if the computer system 10 can be configured to limit the number of collections into which the search results are to be categorized to less than a predetermined maximum number. It may have been determined that including more than this maximum number of collections would undermine the purpose of categorizing the search results, namely, to avoid overwhelming the user with an unwieldly number of search results to evaluate at one time. For example, the maximum number of permissible collections can be set to ten, eight, six, or any other desired number considered to be manageable.

According to other embodiments, the number of collections to be included in the search content to be transmitted over the communication network 16 to the user can depend on the number and significance of the different common properties detected among the uncovered search results. For example, the criteria of the query established based on the search string can be used by the query component 22 to identify the desired products during the search. If there are two criteria specified in the search string (e.g., color and interior paint), and the uncovered search results are somewhat evenly divided between different sheens (e.g., six) available for the paint products satisfying the search string, then the query component 22 can categorize the uncovered search results into a number of collections corresponding to the different sheens available.

Regardless of how the uncovered search results are to be categorized by subject matter, the query component 22 generates the search content to include the collections representing each of the paint products sharing a common property specific to their respective collection. Each collection in the search content can represent all of the paint products sharing the common property associated with the respective collection, including all paint products uniquely identified by a different SKU, even those that differ from each other in a way considered immaterial to the search string such as the size of a package (e.g., one quart, one gallon or five gallons) for a search string specifying a desired paint color. The collections can represent all such products, without causing the display of each and every product (e.g., each different size of container) corresponding to a different SKU that satisfies the search string.

As a specific example, consider a search string for "blue" colored paint entered via the search interface 28 on a website hosted for the benefit of a paint store. The database 24 of paint products for sale through that paint store includes a different SKU for each different shade of blue, in each of six different sheens available through that paint store, with every shade of blue in each sheen being available in at least three different container sizes. If every one of these search results having a different SKU were to be separately included in the search content to be concurrently displayed to the user by the user computer 14, the number of results transmitted would consume a large amount of network resources and bandwidth to convey to the user computer 14. Further, the number of separate search results concurrently displayed would not lend itself to being efficiently reviewed by the user. Accordingly, the query component 22 can limit the search content or at least format the search content to cause the user computer 14 to display the collections of paint products sharing common properties. For the specific example above, if the blue paints are somewhat evenly divided into four different sheens, then the search content can include information indicative of those four different sheens for the color "blue" to be transmitted for display by the user computer 14.

Figure 4:
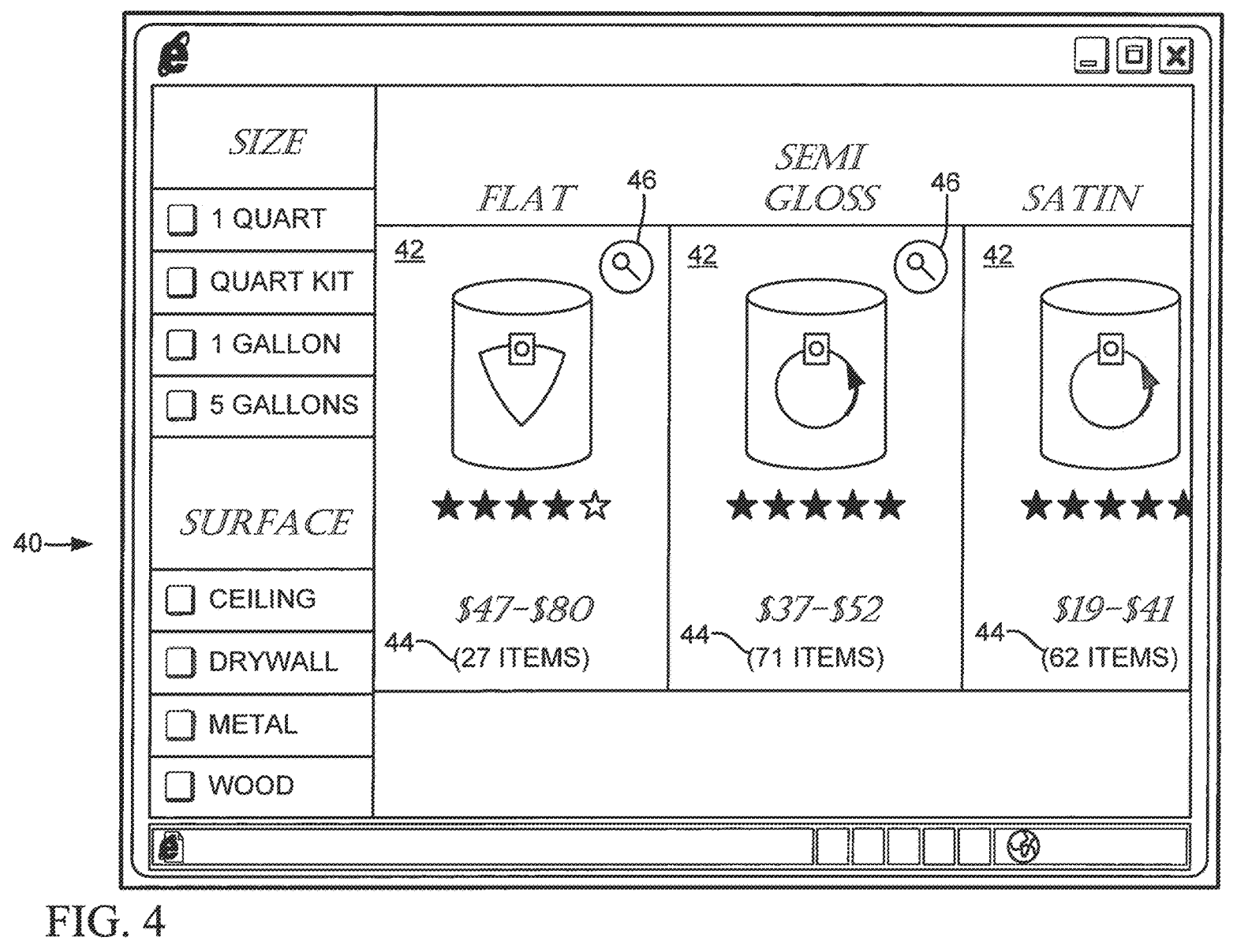

The query component 22 can generate the search content to initially include data indicative of the collections that, when processed by the user computer 14, causes the user computer 14 to display the collections 42 in an interface 40 such as that shown in FIG. 4. As shown, each of three collections 42 appears in the interface 40 in place of a listing of each of the related products in the respective collections 42, individually. Continuing with the specific example of a search for "blue" paint used above, the collections 42 include related products sharing a common sheen: the first collection 42 (from right to left in FIG. 4) includes related paint products sharing a flat sheen, the second collection 42 includes related products sharing a semi-gloss sheen, and the third collection 42 includes related products sharing a satin sheen. A parenthetical 44 appearing as part of each collection 42 indicates to the user the number of related items categorized under each collection 42. Instead of transmitting search content for the user computer 14 to display all 160 search results returned by the search and allocated to the three collections 42, an overview of the three collections 42 included in the search content is displayed instead.

In the above example, the query component 22 excluded from the search content the detailed information required to be transmitted by the server component 18 for the user computer 14 to uniquely distinguish and display each individual related product included in at least one, and optionally all of the collections 42. Thus, for the first collection 42 including 27 related products categorized thereunder, there may be nine different paint products (e.g., different shades of blue, different chemical compositions, etc.), each available in three different-sized containers (e.g., one quart, one gallon, five gallon). Although a different SKU may be assigned to each different size container of the same paint, the detailed information such as price, availability, etc. concerning the nine different paints specifically for each of the individual sizes was not transmitted as part of the search content. Instead, the search content included information indicative of an icon 46 associated with each collection 42, linking each of the collections 42 to network-accessible content that is retrievable over the communication network 16 for each of the related products in the respective collection 42. This network-accessible content includes detailed information uniquely identifying and distinguishing the related products in respective collection 42, optionally included each different size of container available. In response to the server component 18 receiving a user selection of one of the icons 46, the server component 18 transmits the detailed information concerning each of the related products over the communication network 16 to be received by the user computer 14. According to such an embodiment, only the detailed information included in the first collection 42 selected by the user can be transmitted. Instead of transmitting the search content to individually display all 160 items included in the three collections 42 shown in FIG. 4, only information concerning an overview of the three collections 42 was initially included in, and transmitted as the search content, along with a link to the detailed information of each collection 42. Generally, a number of collections 42 far fewer than one half (½), fewer than a third (⅓), and fewer than one quarter (¼) of the number of related products can be transmitted as the search content in place of detailed information about each of the related products. The other detailed information concerning the related products in the other, unselected collections 42 can optionally not be transmitted, thereby conserving communication network 16 and computer system 10 resources.

According to an alternate embodiment of the computer system 10, the data included in the search content representing the collections can optionally also include data representing each of the related paint products categorized in each of the collections 42. For example, low-resolution images, predominantly-text information, or other content that would not significantly increase the quantity of data transmitted relative to the quantity of data transmitted as the search content for the examples above can be included in the search content and transmitted by the server component 18. For such embodiments, the collections constitute a collapsed grouping of the respective related products, and selection of the icon 46 for the first collection 42 can simply expand that collection 42 to cause the user computer 14 to locally display those related products without additional communication with the server component 18 over the communication network 16.

Figure 5:
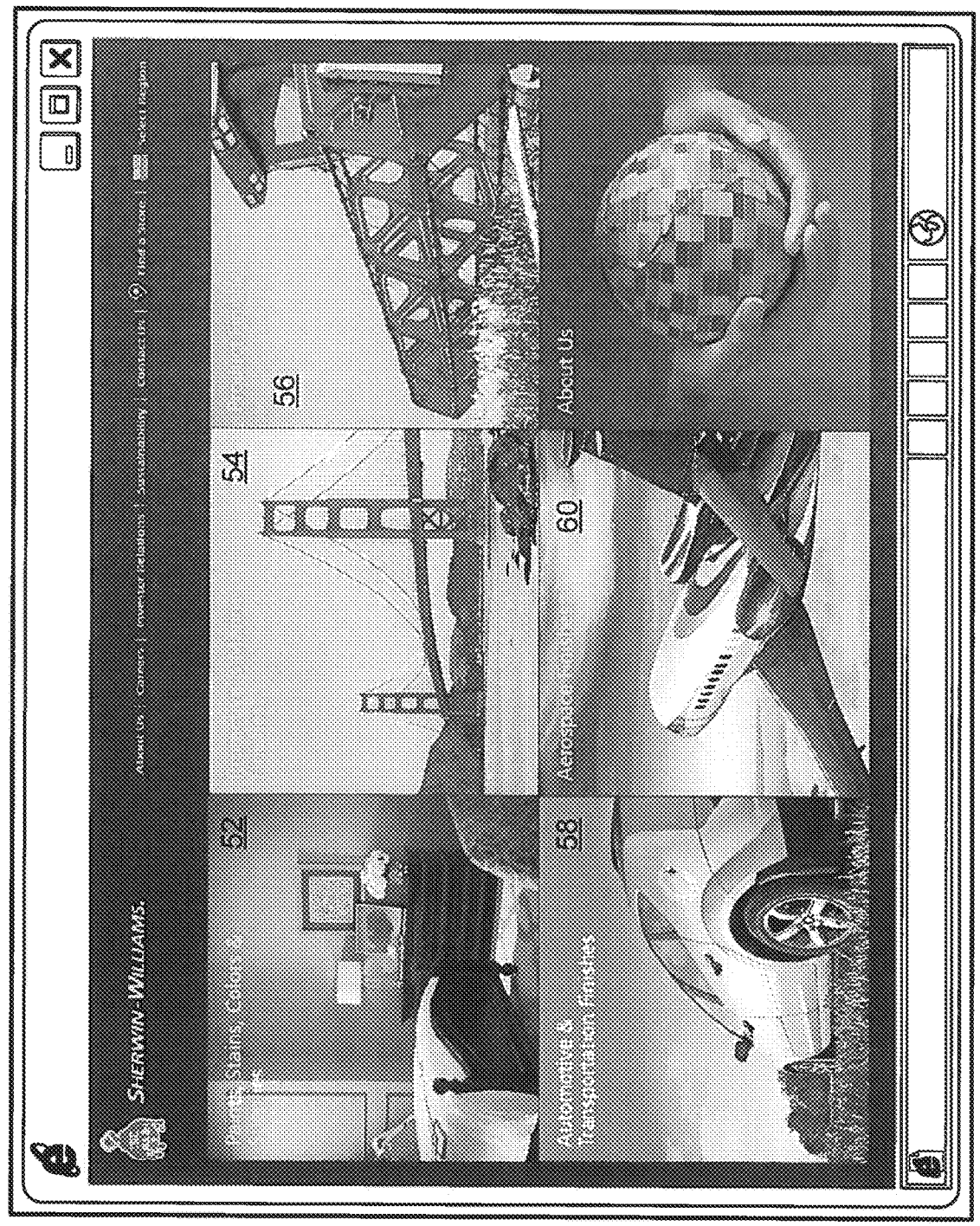
FIG. 5 is an illustrative representation of a categorized product interface generated by a user computer utilizing content served by a server.

According to alternate embodiments, instead of receiving a search string to identify a plurality of related results to be transmitted to a user computer 14 via the communication network 16, the server 12 can receive a manual selection of a specific product and/or product category having a plurality of variants in the database 24. For example, with reference to FIG. 5, the user computer 14 can present an interface 50 with a categorical breakdown of coatings. For the embodiment depicted in FIG. 5, the categories include coatings and/or finishes for various different industries, including general paints, stains, colors and supplies 52, protective and marine finishes 54, product finishes 56, automotive and transportation finishes 58, and aerospace finishes 60. A selection of the different categories will return to the user computer 14 different product criteria that can be selected by the user to narrow down the number of products to a manageable number from which the user can select the desired product. However, each of the categories can include at least one, and optionally a plurality of criteria specific to those respective categories. For the sake of brevity and clarity, however, the present embodiments will be described for use in selecting a color of paint.

Figure 6:
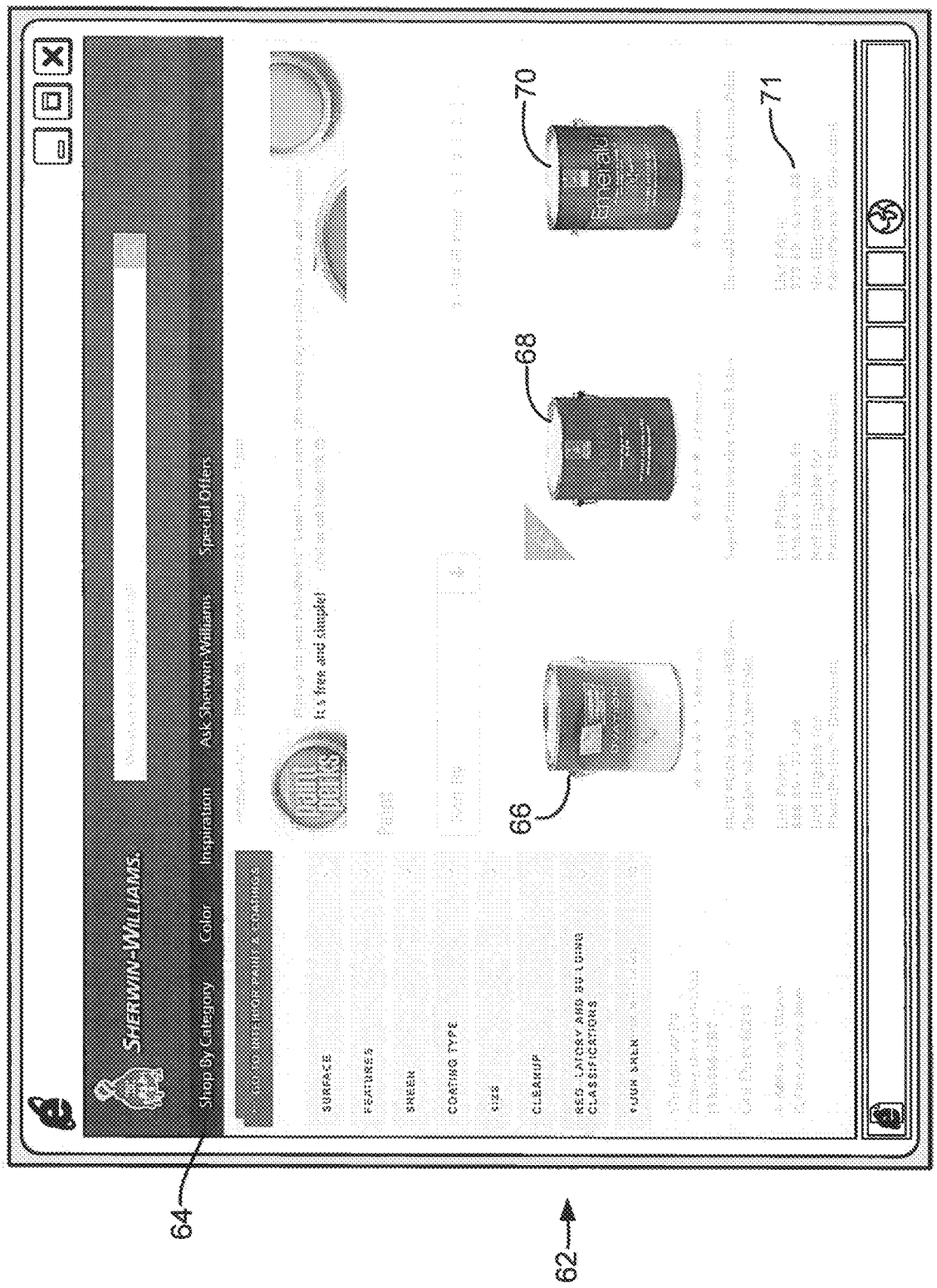
FIG. 6 is an illustrative representation of a paint selection interface generated by a user computer utilizing content served by a server.

In response to a user selection of the general paints, stains, colors and supplies category 52, the server 12 transmits data that is to be processed by the user computer 14 to present an interior paint interface 62, allowing the user to select from a menu 64 of a plurality of categories of paint, as shown in FIG. 6. The categories can include options for interior paints, outdoor paints, paint supplies (e.g., rollers, brushes, etc.), wallpaper, etc. Selecting interior paints, for example, results in the server 12 transmitting data indicative of each of the different types of interior paint available. In FIG. 6, the first three types of interior paint, Ovation Interior Latex Paint 66, SuperPaint Interior Acrylic Latex 68, and Emerald Interior Acrylic Latex Paint 70, out of the twenty (20) total types of interior paint available appear in a scrollable list displayed by the user computer 14. A price range 71 can also be provided for each selectable option, indicating that there are multiple paint variants available for those options.

Figure 7:
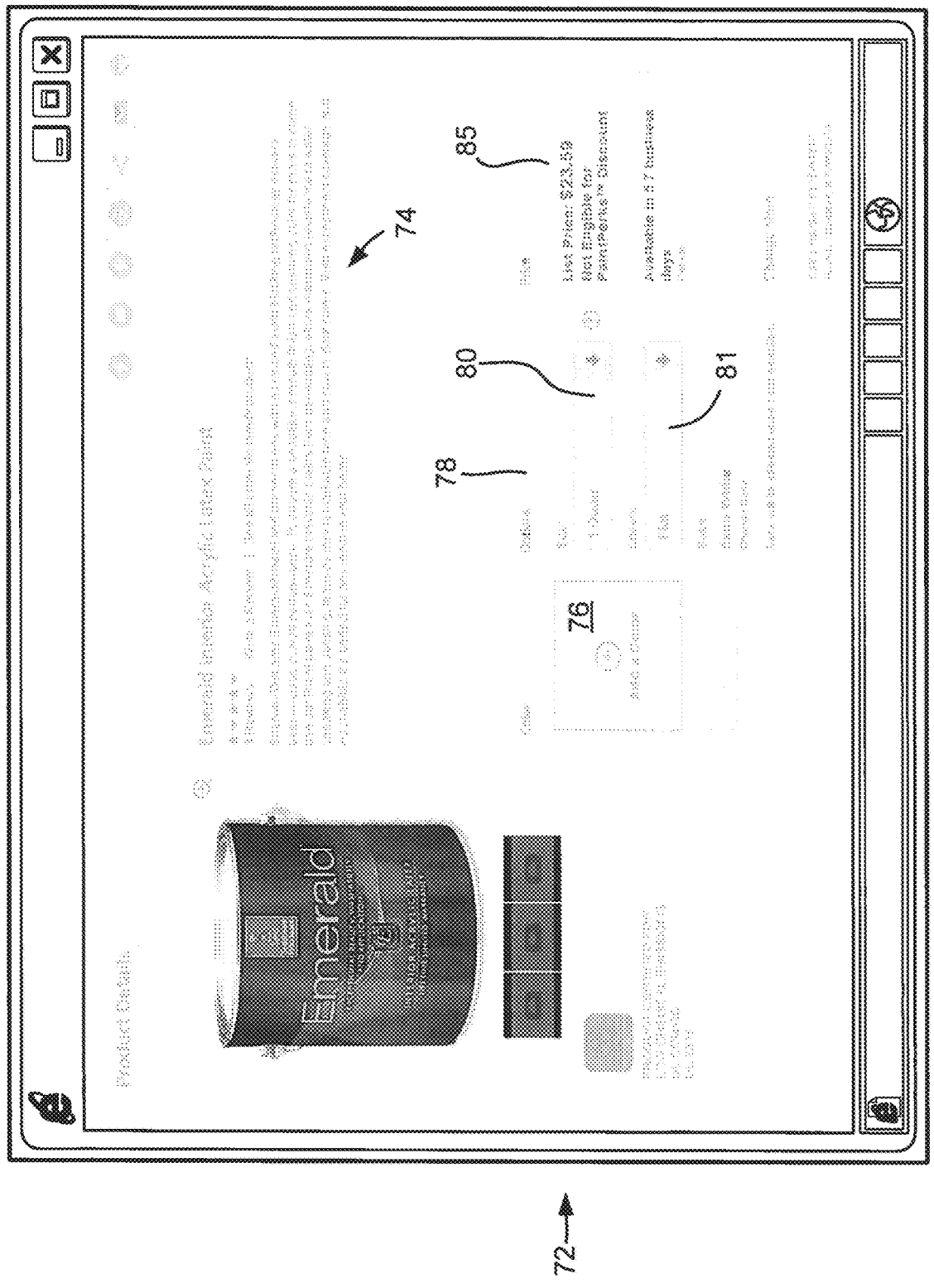
FIG. 7 is an illustrative representation of a summary interface generated by a user computer utilizing content served by a server in response to receiving a user's paint selection.
Figure 8:
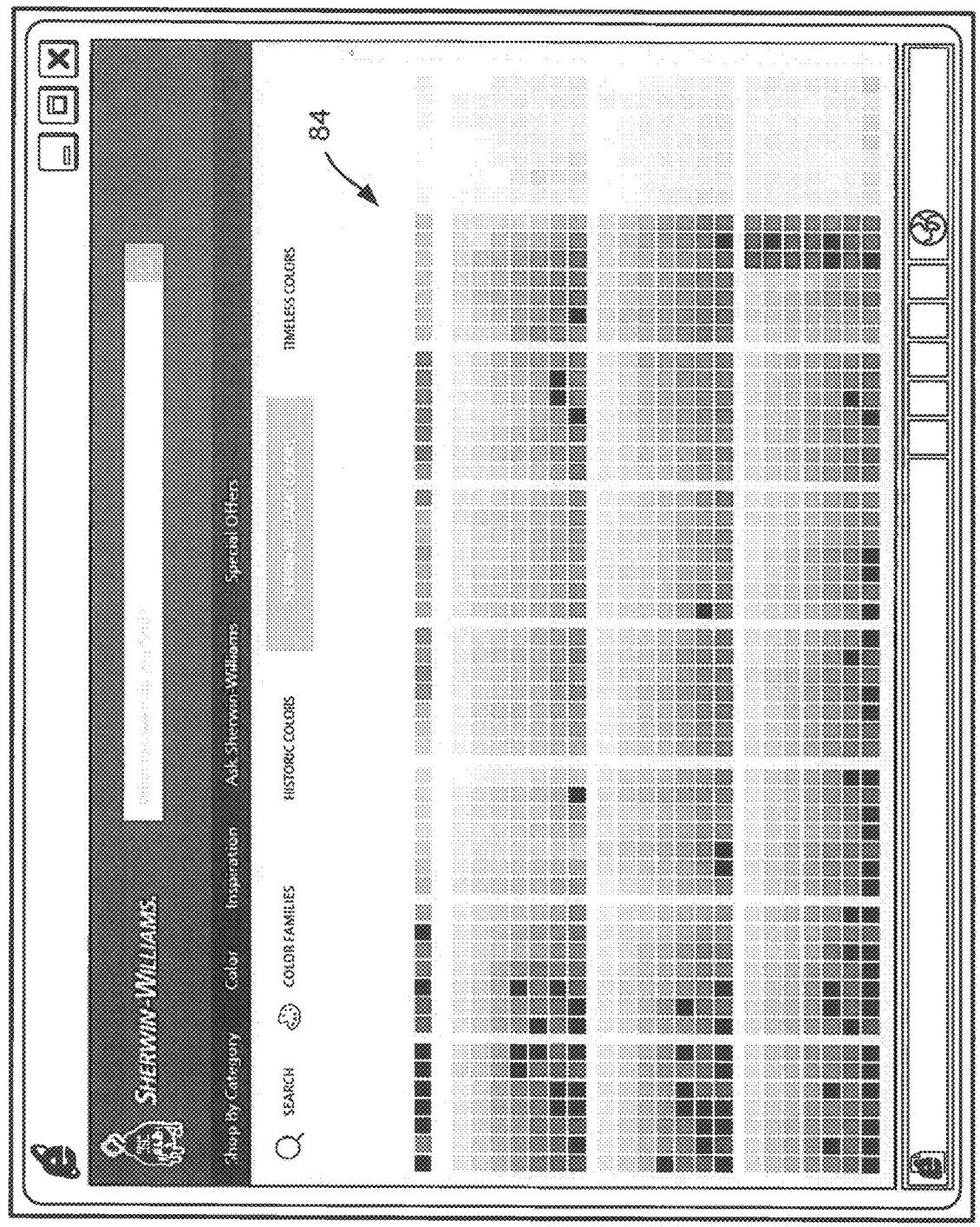
FIG. 8 is an illustrative representation of a color menu ding an arrangement of colors selectable by the user.

A detailed description 74 of the properties of the selected paint, shown in the summary interface 72 of FIG. 7 as the Emerald Interior Acrylic Latex Paint 70 selected from the interface 62, is transmitted by the server 12 in response to receiving the user's selection. The summary interface 72 also includes a color selection tool 76 and at least one, and optionally a plurality of selectable options 78 that affect the price of the paint. In response to a user's selection of the color selection tool 76, the server 12 transmits data that is to be processed by the user computer 14 to display a color selection interface 82 such as that shown in FIG. 8. The interface 82 includes a plurality of menus that enable the user to manually select a desired color from among different collections or arrangements of paint, such as a specific family of colors or color pallet. As shown in FIG. 8, however, a so-called "color wall" 84 is displayed to present the full, or at least a partial spectrum of the proprietary colors offered by the paint vendor. The proprietary colors can be arranged on the color wall 84 as a grid, and according to any desired property such as visible spectrum (wavelength), light/dark, temperature, hue, color number, etc., creating an appearance with natural, gradual transitions between contiguous color options.

Figure 9:
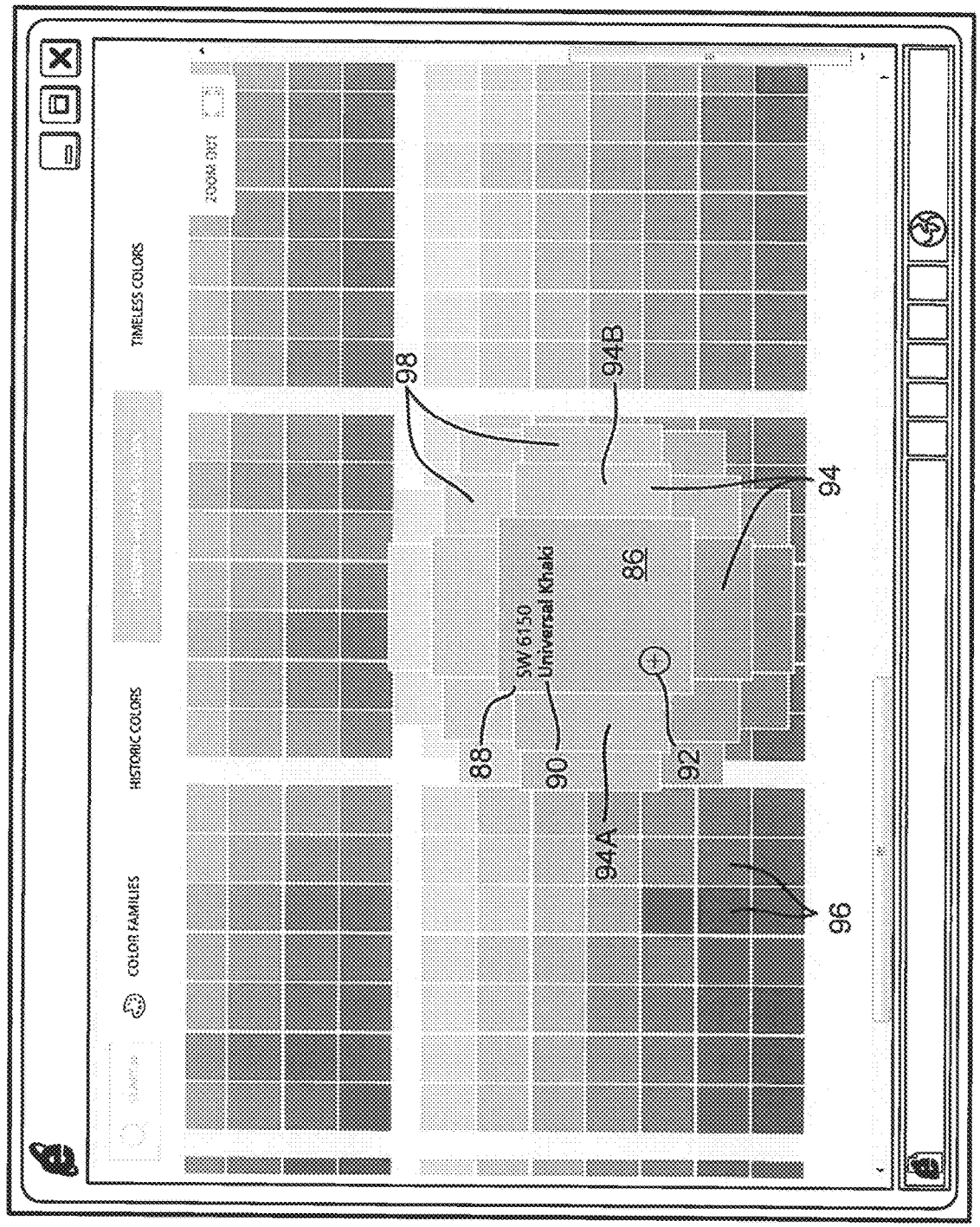
FIG. 9 shows an enlarged view of a selected color tile corresponding to an initial color of interest to the user.

User selection of a color tile 86 from the color wall 84 corresponding to a color of interest results in magnification of that color tile 86 on the user computer 14 relative to other, unselected color tiles, to present the user with a closer view of the initial color of interest, as shown in FIG. 9. The selected color is said to be of "initial interest" in that the selected color is not established as the final color of the paint even though the user selected that specific color from the grid. Instead, the selected color tile 86 is magnified to present the user with a better, larger view of the color selected as the color of initial interest to allow the user to make a more-informed decision based on the enlarged viewing area compared to the small color tile 86 in the grid prior to magnification. The magnified color tile 86 can be displayed with descriptive information such as the vendor's internal color number 88, an optional color name 90, or any other information specific to the color appearing on the magnified color tile 86. A confirmation symbol or button 92 is also displayed adjacent to or on the magnified color tile 86, and optionally only on the magnified color tile 86, to be selected by the user to confirm that the initial color of interest is actually the desired color of paint the user would like to purchase. In response to selection of the confirmation symbol or button 92, the color of initial interest is established as the final color of the paint.

In addition to magnifying the color tile 86 corresponding to the color of initial interest, at least one, and optionally a plurality of neighboring color tiles 94 contiguous to the magnified color tile 86 can also be partially enlarged, yet at least partially concealed from view by the magnified color tile 86. So enlarging the neighboring color tile(s) 94 creates a three-dimensional appearance of the magnified color tile 86 protruding from the color wall 84, further toward the user than the neighboring tile(s) 94, and other, unselected color tiles 96. One or more additional tiers of neighboring tiles 98 can also optionally appear to protrude from the color wall 84 to a lesser extent than the neighboring tile(s) 94. Each of the neighboring tiles 94 can correspond to colors that are most-closely related to the initial color of interest shown by color tile 86 based on the criteria used to arrange the colors in the color wall 84. For example, the neighboring tile 94A to the immediate left of the magnified color tile 86 can have a hue that is one unit less than the color of initial interest. Likewise, the neighboring tile 94B to the immediate right of the magnified color tile 86 can have a hue that is one unit greater than the color of initial interest. Of course, any stepwise distinction between the color of interest and the neighboring tile(s) 94 can be utilized according to the present disclosure.

Having reviewed the magnified color tile 86, the user can select the color of initial interest as the final color of the paint to be purchased by selecting the confirmation button 92. The selected color then fills the icon of the color selection tool 76 appearing in FIG. 7. The user can then manipulate a size pull-down menu 80 to select the volume of paint to be purchased (e.g., 1 quart, 1 gallon, 5 gallons, etc.), Similarly, the sheen pull-down menu 81 can also be manipulated by the user to select the desired sheen of the paint (e.g., flat, matte, satin, semi-gloss, etc.). Although the selections above are made by way of pull-down menus 80, 81, any suitable selection interface such as check boxes, radio buttons, and the like can be utilized as is known in the art without departing from the scope of the present disclosure. Once all of the parameters concerning the paint have been entered, the final price 85 (FIG. 7) of the configured paint can be accurately displayed to the user instead of as a range covering the full range of variants, and the user can optionally elect to submit the order over the communication network 16 to a brick-and-mortar store where the user-selected paint can be mixed and picked up.

The preceding embodiment described with reference to FIGS. 5-9 involved first selecting the type of paint (interior paint) followed by a selection of the desired color, volume and sheen. However, it is to be understood that the present disclosure is not so limited. For instance, facilitating the selection of paint without separately displaying all paint variants (e.g., same paint color, but separate volume, sheen, etc. individually) can be accomplished by allowing the user to start by selecting the desired color as described with reference to FIGS. 8 and 9, followed by a selection of the type of paint (e.g., interior, exterior, etc.). For such alternate embodiments, if the selected color is not available as an exterior paint, then the user will be prevented from selecting an exterior paint as an available type. Likewise, in any of the embodiments, if the selected color and/or type is not available with a satin sheen, then such a sheen can be rendered non-selectable (e.g., grayed out, omitted altogether, etc.) from the sheen menu 81. The other selectable options can also be so customized based on previous user selections.

Although the examples above focus on paint products uniquely identified according to color, sheen and container size, other examples of related products that can be uniquely identified by an internal reference number such as a SKU include, but are not limited to of paint products having differing by at least one of, optionally a plurality of, and optionally all: a color, a finish, a location where the paint product is suitable for use, a type of the paint product, a brand of the paint product, and a description of the paint product.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of facilitating selection of a paint by a user over a communication network, the method comprising:
   with a server component of a computer system, receiving a type of the paint available on a website desired by the user over the communication network;
   transmitting content over the communication network to be utilized by a user computer to present the user with an arrangement of available colors for the paint;
   receiving a desired color selected by the user from the arrangement of available colors;
   in response to the type of the paint and the desired color, the server component:
      generating search results including all variants of the paint available on the website that match both the type of the paint and the desired color selected by the user;
      generating content indicative of a collection of variants of the paint in the search results, the variants in the collection each having at least one common property; and
      without transmitting content over the communication network to cause the user computer to separately present all variants of the paint in the search results, conserving network resources and bandwidth by transmitting the content indicative of the collection and a selectable menu of options for specifying an additional parameter that identifies a desired variant of the paint.

2. The method of claim 1, wherein said transmitting content to be utilized by the user computer to present the user with the arrangement of available colors occurs after the server component receives the type of the paint.

3. The method of claim 1, wherein said transmitting content to be utilized by the user computer to present the user with the arrangement of available colors occurs before the server component receives the type of the paint.

4. The method of claim 1 further comprising transmitting content over the communication network to cause the user computer to present a second selectable menu of options for specifying a second additional parameter that, in combination with the additional parameter, uniquely identifies the desired variant of the paint.

5. The method of claim 4, wherein the additional parameter comprises a sheen and the second additional parameter comprises a desired volume of the paint.

6. The method of claim 1, wherein the additional parameter uniquely identifies the desired variant of the paint.

7. The method of claim 1, wherein the additional parameter comprises at least one of a sheen and a desired volume of the paint.

8. The method of claim 1, wherein said transmitting content to be utilized by the user computer to present the user with the arrangement of available colors for the paint comprises:
   transmitting content to establish a grid of the available colors arranged according to a color parameter; and
   magnifying a portion of the grid corresponding to the desired color selected by the user as a color of initial interest relative to other portions of the grid corresponding to colors that were not selected by the user.

9. A computer system for efficiently facilitating selection of a paint by a user over a communication network, the method comprising:
   a non-transitory computer storage device storing a database of paint that is selectable on a website; and
   a server component that:
      receives a type of the paint available on the website selected as being desired by the user over the communication network;
      transmits content over the communication network to be utilized by a user computer to present the user with an arrangement of available colors for the paint;
      receives a desired color selected by the user from the arrangement of available colors, and
      in response to the type of the paint and the desired color:
         generating search results including all variants of the paint available on the website that match both the type of the paint and the desired color selected by the user;
         generating content indicative of a collection of variants of the paint in the search results, the variants in the collection each having at least one common property; and
         without transmitting content over the communication network to cause the user computer to separately present all variants of the paint in the search results, conserving network resources and bandwidth by transmitting the content indicative of the collection and a selectable menu of options for specifying an additional parameter that identifies a desired variant of the paint.

10. The computer system of claim 9, wherein the server component transmits the content to be utilized by the user computer to present the user with the arrangement of available colors after the server component receives the type of the paint.

11. The computer system of claim 9, wherein the server component transmits the content to be utilized by the user computer to present the user with the arrangement of available colors before the server component receives the type of the paint.

12. The computer system of claim 9, wherein the server component is further configured to transmit content over the communication network to cause the user computer to present a second selectable menu of options for specifying a second additional parameter that, in combination with the additional parameter, uniquely identifies the desired variant of the paint.

13. The computer system of claim 12, wherein the additional parameter comprises a sheen and the second additional parameter comprises a desired volume of the paint.

14. The computer system of claim 9, wherein the additional parameter uniquely identifies the desired variant of the paint.

15. The computer system of claim 9, wherein the additional parameter comprises at least one of a sheen and a desired volume of the paint.

16. The computer system of claim 9, wherein the server component is further configured to:
   transmit content to establish a grid of the available colors arranged according to a color parameter; and
   magnify a portion of the grid corresponding to the desired color selected by the user as a color of initial interest relative to other portions of the grid corresponding to colors that were not selected by the user.

* * * * *